(12) United States Patent
Cebula et al.

(10) Patent No.: US 10,434,990 B2
(45) Date of Patent: Oct. 8, 2019

(54) WATER DRAINAGE COVER FOR AN AUTOMOTIVE WINDSHIELD WIPING MECHANISM, BODY OF A SHAFT OF AN AUTOMOTIVE WINDSHIELD WIPER MECHANISM, AND AUTOMOTIVE WINDSHIELD WIPER MECHANISM CONTAINING THE COVER AND THE BODY

(71) Applicant: Valeo Autosystemy Sp. z o.o., Skawina (PL)

(72) Inventors: Piotr Pawel Cebula, Skawina (PL); Wojciech Orzel, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 72 days.

(21) Appl. No.: 15/541,730

(22) PCT Filed: Dec. 17, 2015

(86) PCT No.: PCT/EP2015/080241
§ 371 (c)(1),
(2) Date: Jul. 6, 2017

(87) PCT Pub. No.: WO2016/110390
PCT Pub. Date: Jul. 14, 2016

(65) Prior Publication Data
US 2017/0355351 A1 Dec. 14, 2017

(30) Foreign Application Priority Data
Jan. 9, 2015 (PL) .......................... 410833

(51) Int. Cl.
*B60S 1/34* (2006.01)
*B60S 1/04* (2006.01)

(52) U.S. Cl.
CPC ............. *B60S 1/3479* (2013.01); *B60S 1/349* (2013.01); *B60S 1/3443* (2013.01); *B60S 1/0433* (2013.01)

(58) Field of Classification Search
CPC ...... B60S 1/3479; B60S 1/3443; B60S 1/349; B60S 1/0433; B60S 1/043; B60S 1/0463;
(Continued)

(56) References Cited

U.S. PATENT DOCUMENTS 6,318,735 B1 * 11/2001 Lambeth .................. B60S 1/34
15/250.31
9,944,254 B2 * 4/2018 Akashi .................. B60S 1/0433
(Continued)

FOREIGN PATENT DOCUMENTS

JP     2000085541 A     3/2000
JP     2005-324710     * 11/2005
(Continued)

OTHER PUBLICATIONS

Machine translation of description portion of Japanese publication 2011-105098, published Jun. 2011. (Year: 2011).*
(Continued)

*Primary Examiner* — Gary K. Graham
(74) *Attorney, Agent, or Firm* — Osha Liang LLP

(57) ABSTRACT

The subject-matter of the invention is a water draining cover (1) for an automotive windshield wiping mechanism, containing a positive connection element (4) of the cover, adapted for securing on the body (2) of the shaft (11), containing an opening on the shaft (5) and surrounded by a gutter part (6) containing a drainage opening (7), characterized in that the positive connection element of the cover (4) does not have a continuous rotary symmetry with regard to the X axis, and in each transverse section in the plane perpendicular to the X axis it has the shape of a convex
(Continued)

figure, and furthermore the positive connection element of the body (3) has means of blocking the movement of the cover (1) in a direction parallel to the X axis when the cover (1) is mounted on the body (2), preferably in the form of at least one projection and/or recess (9), preferably perpendicular to the X axis, while the X axis is defined as a straight line passing through the opening on the shaft (5), coinciding with the axis of rotation of the shaft (11) when the cover (1) is properly mounted on the body (2). The subject-matter of the invention is also the body (2) of a shaft (11) corresponding to the cover of the invention, as well as an automotive windshield wiper mechanism containing the cover (1) and the body (2).

7 Claims, 4 Drawing Sheets

(58) Field of Classification Search
CPC ....... B60S 1/0458; B60S 1/0472; F16J 15/02; F16J 15/54
USPC ............ 15/250.3, 250.31; 277/392, 634, 637
See application file for complete search history.

(56) References Cited

U.S. PATENT DOCUMENTS

| 2004/0034959 | A1* | 2/2004 | Nakamura | B60S 1/0425 |
| | | | | 15/250.31 |
| 2006/0005341 | A1* | 1/2006 | Lee | B60S 1/0433 |
| | | | | 15/250.31 |
| 2009/0094773 | A1* | 4/2009 | Hasegawa | B60S 1/245 |
| | | | | 15/250.27 |

FOREIGN PATENT DOCUMENTS

| JP | 2009-190587 A | 8/2009 |
| JP | 2011-105098 | * 6/2011 |

OTHER PUBLICATIONS

International Search Report issued in corresponding application No. PCT/EP2015/080241 dated Feb. 12, 2016 (2 pages).
Written Opinion of the International Searching Authority issued in corresponding application No. PCT/EP2015/080241 dated Feb. 12, 2016 (5 pages).

* cited by examiner

WATER DRAINAGE COVER FOR AN AUTOMOTIVE WINDSHIELD WIPING MECHANISM, BODY OF A SHAFT OF AN AUTOMOTIVE WINDSHIELD WIPER MECHANISM, AND AUTOMOTIVE WINDSHIELD WIPER MECHANISM CONTAINING THE COVER AND THE BODY

The subject-matter of the invention is a water drainage cover for an automotive windshield wiper mechanism, a body of a shaft of the automotive windshield wiper mechanism and an automotive windshield wiper mechanism containing the cover and the body.

Covers are known for an automotive windshield wiper mechanism (for example, the cover presented in application JP2000085541) serving to protect the mechanism from water getting into it. These covers are secured on the body of the shaft and contain a gutter element with an opening or openings serving to drain water away from the mechanism. Such covers can rotate about the body during the operation of the mechanism, which is often an unwanted effect.

Document JP2009190587 presents covers whose elements creating a positive connection with the body have the shape of a cylinder with longitudinal recesses (along the axis of rotation of the shaft), projecting radially beyond the contour of the cylinder, corresponding to longitudinal elements projecting radially from the body. After placing the cover on the body in such a way that tongues of the body are located in the recesses of the cover, the movement of the cover about the body is blocked.

Shear forces act unfavourably on the recesses of such a cover and the projections of the body.

The goal of the invention is therefore to provide a cover whose shape reduces the influence of such forces.

The essence of the invention is a water draining cover for an automotive windshield wiping mechanism, containing a positive connection element of the cover, adapted for securing on the body of the shaft, containing an opening in the shaft and surrounded by a gutter part containing a drainage opening, characterized in that the positive connection element of the cover does not have a continuous rotary symmetry with regard to the X axis, and in each transverse section in the plane perpendicular to the X axis it has the shape of a convex figure, and furthermore the positive connection element of the cover has means of blocking the movement of the cover in a direction parallel to the X axis when the cover is mounted on the body, advantageously in the form of at least one projection and/or recess, preferably perpendicular to the X axis, while the X axis is defined as a straight line passing through the opening in the shaft, coinciding with the axis of rotation of the shaft when the cover is properly mounted on the body.

Thanks to the fact that in each transverse section in a plane perpendicular to the X axis the positive connection element of the cover has the shape of a convex figure, the movement of the cover about the X axis is blocked with reduced influence of shear forces on the element, and furthermore the production of such a cover is easier (the shapes for fabricating such covers are more simple).

The lack of symmetry of the positive connection element of the cover with respect to the X axis means that the X axis is the axis of symmetry of an element of infinite multiplicity, or the shape of this element is not a solid of revolution. In other words, at least one transverse section through the element in the plane perpendicular to the X axis has a shape different from a circle.

In addition, the cover contains means of blocking the movement of the cover in a direction parallel to the X axis when the cover is mounted on the body, preferably in the form of projections and recesses, which also assist the blocking of the rotation about the X axis.

Preferably the convex figure formed by a transverse section through the positive connection element in the plane perpendicular to the X axis does not have any rotational symmetry with respect to the X axis.

Preferably the cover contains two projections, preferably in the form of ribs perpendicular to the X axis, preferably disposed symmetrically on the positive connection element of the cover.

Preferably the cover contains two recesses, preferably in the form of grooves perpendicular to the X axis, preferably disposed symmetrically on the positive connection element of the cover.

Preferably the opening on the shaft is surrounded by a collar.

The subject-matter of the invention is also a body of the shaft of an automotive windshield wiper mechanism, containing a positive connection element of the body, adapted for fastening the cover on it, characterized in that the positive connection element of the body does not have a continuous rotary symmetry with regard to the X axis, and in each transverse section in the plane perpendicular to the X axis it has the shape of a convex figure, and furthermore the positive connection element of the body has means of blocking the movement of the cover in a direction parallel to the X axis when the cover is mounted on the body, advantageously in the form of at least one projection and/or recess, preferably perpendicular to the X axis, while the X axis is defined as a straight line coinciding with the axis of rotation of the shaft when the shaft is properly secured in the body.

Preferably said convex figure does not have any rotational symmetry with respect to the X axis.

Preferably the body contains two projections, preferably in the form of ribs perpendicular to the axis of rotation, preferably disposed symmetrically on the positive connection element of the body.

Preferably the body contains two recesses, preferably in the form of grooves perpendicular to the axis of rotation, preferably disposed symmetrically on the positive connection element of the body.

Furthermore the subject-matter of the invention is an automotive windshield wiper mechanism, characterized in that it comprises a cover according to the invention, mounted on a body according to the invention, wherein the positive connection element of the cover forms a positive connection with the positive connection element of the body, such that rotation of the cover about the X axis is blocked.

Preferably the means of blocking the movement of the cover situated on the positive connection element of the cover cooperate with the means of blocking the movement of the cover situated on the positive connection element of the body.

The invention shall now be presented more closely in a preferred sample embodiment, with reference to the enclosed figures, in which.

PREFERRED SAMPLE EMBODIMENT

Figure 1:
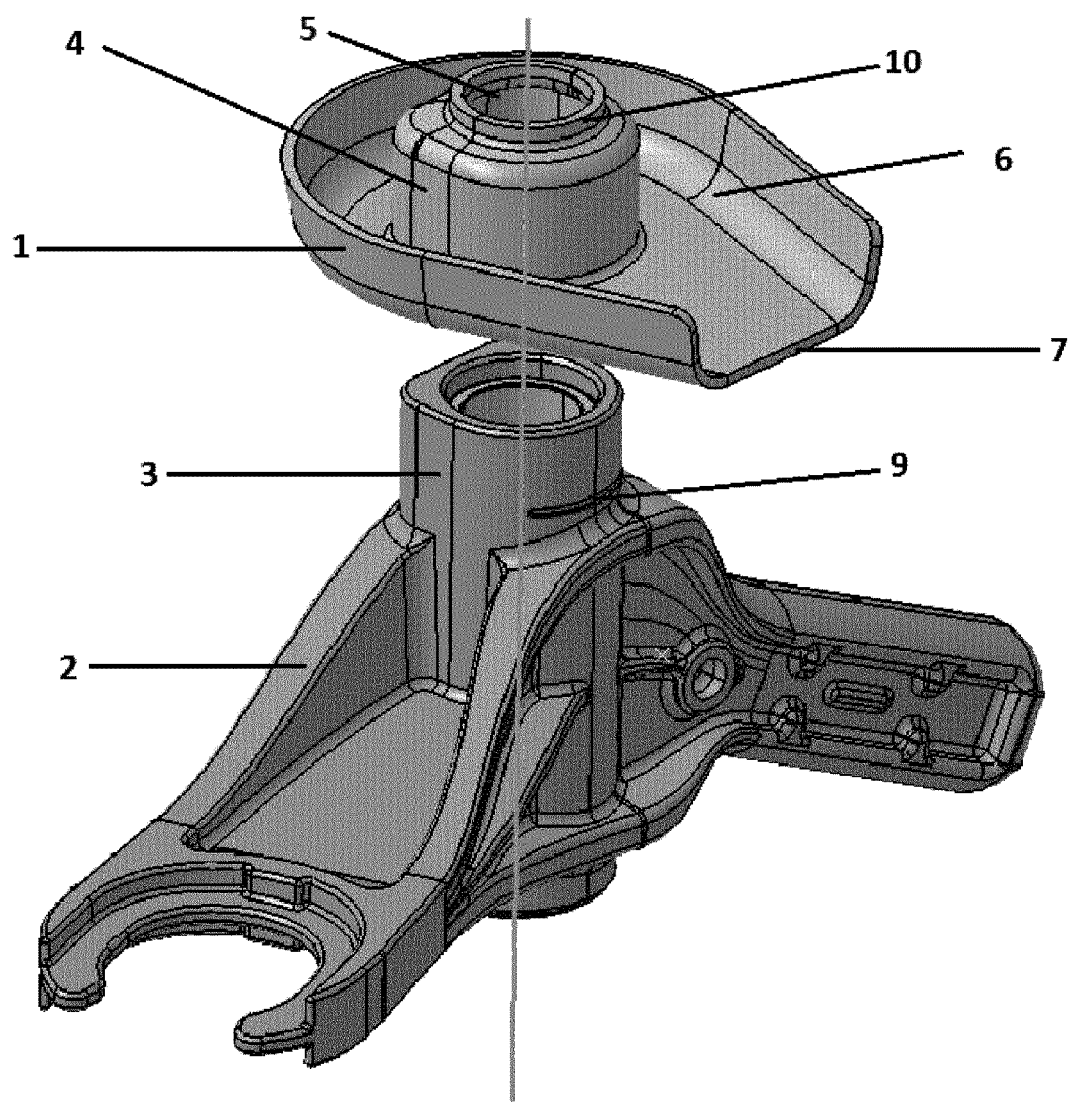
FIG. 1 shows the cover and the body of the shaft in an isometric view.
Figure 2:
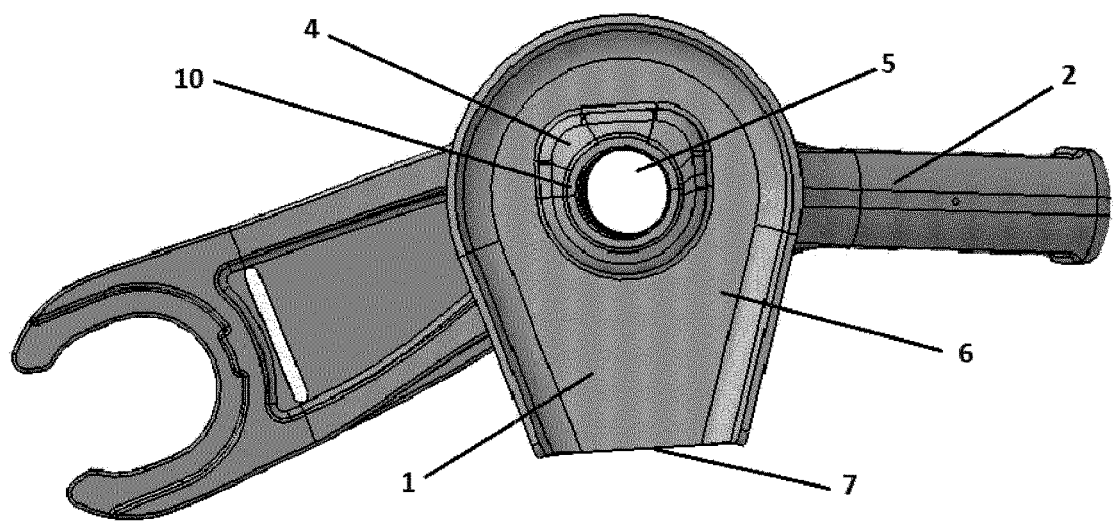
FIG. 2 shows the cover and the body of the shaft in a top view.

FIG. 1 and FIG. 2 show the water drainage cover (1) intended for an automotive windshield wiper mechanism. The cover has a positive connection element (4) adapted for mounting the cover on the body (2) and a gutter part (6), which shields the mechanism from water getting into it, draining the water through a drainage opening (7). The positive connection element of the cover (4) serves to fasten the cover on the body (2) of the shaft. A transverse section through this element (4), in a plane perpendicular to the axis determined by the axis of rotation of the shaft (11), when the cover is properly mounted on the body (2), has the shape of a convex figure (a figure composed of a half circle and a half rectangle with rounded corners), not having any rotational symmetry (either continuous or discrete). Thanks to the fact that the shape of the positive connection element of the cover (4) is not a solid of revolution, the rotation of the cover is blocked when it is mounted on the corresponding body (2), which has a positive connection element of the body (3) with a shape corresponding to the shape of the positive connection element of the cover (1), such that both these elements (3, 4) form a positive connection.

Figure 3:
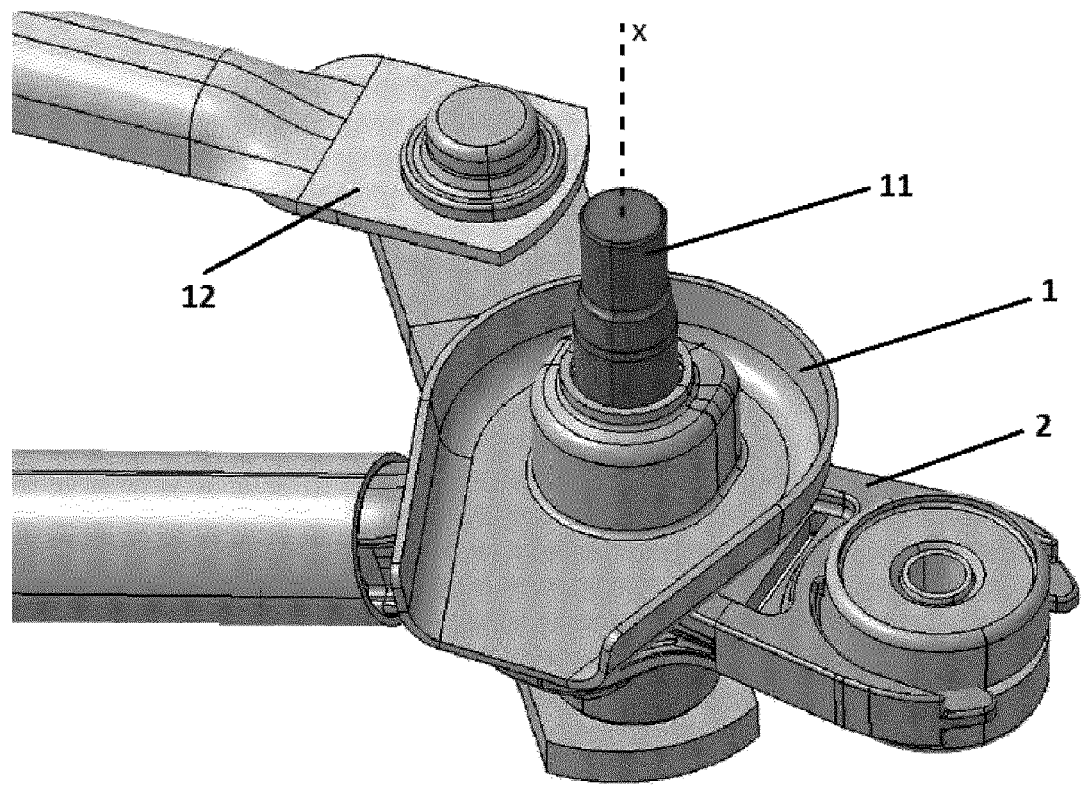
FIG. 3 shows the automotive windshield wiper mechanism with the cover in place.

The automotive windshield wiper mechanism with the cover (1) mounted on the body (2) is shown in FIG. 3. Thanks to the positive connection of the cover (1) to the body (2) of corresponding shape, the rotation of the cover about the X axis is blocked and the cover (1) does not rotate during the working of the tension member (12).

In order to block the rotation of the cover (1), the elements forming the positive connection (3, 4) cannot have a continuous rotational symmetry (the X axis cannot be an axis of symmetry of these elements of infinite multiplicity), while a discrete symmetry is possible, i.e. the elements forming the positive connection (3, 4) can have the shape of a regular polygon in cross section, for example. However, preferably the elements forming the positive connection (3, 4) do not have any rotational symmetry. Thanks to this, an improper fastening of the cover (1) on the body (2) is not possible (the drainage opening will be pointing in the proper direction).

The cover (1) has a collar (10) around the opening (5) for the shaft (11), which collar (10) after fastening the arm of the wiper to the shaft forms with a corresponding collar of the arm an additional protection against water for the mechanism.

The cover (1) and the body (2) possess means of blocking the movement of the cover (1) in a direction parallel to the X axis when the cover (1) is mounted on the body (2), preferably in the form of at least one projection (8) and/or recess (9), preferably perpendicular to the X axis.

Figure 4:
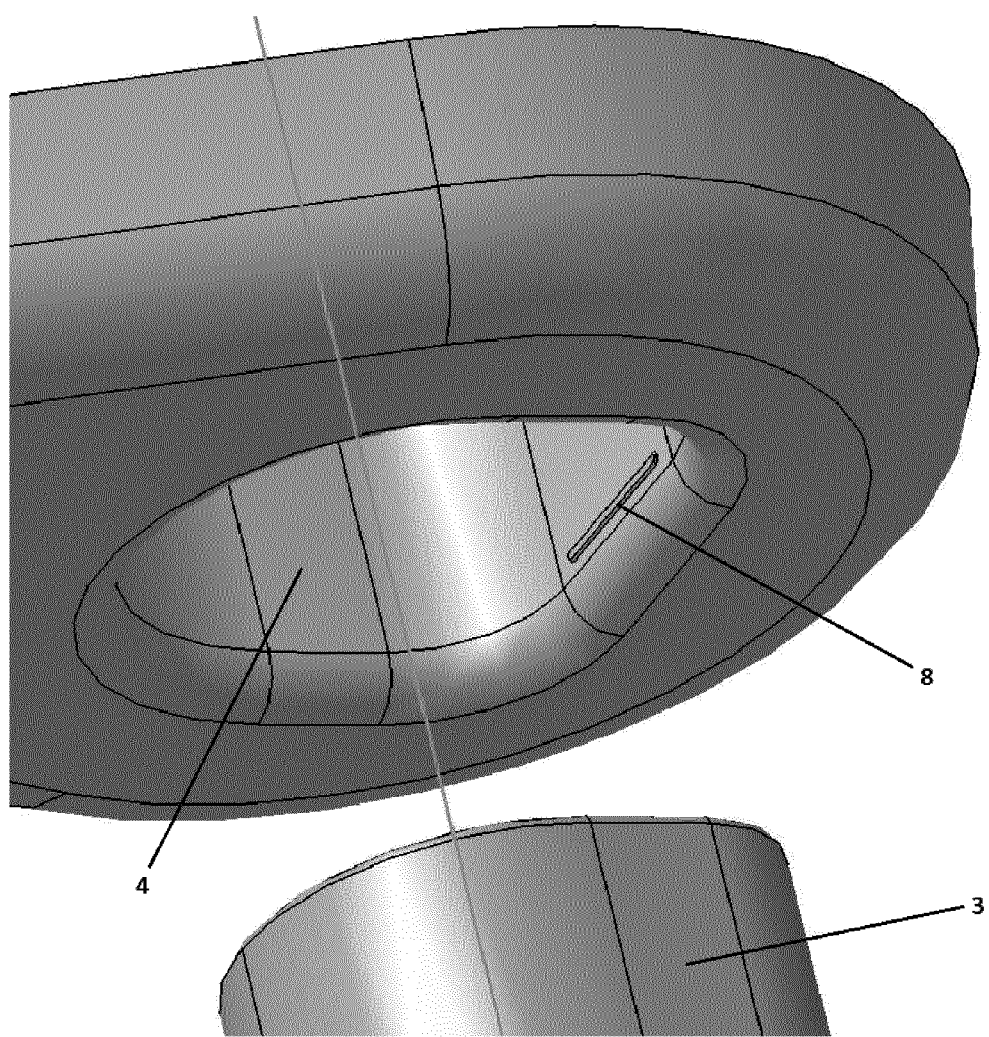
FIG. 4 shows the internal part of the positive connection element of the cover.
Figure 5:
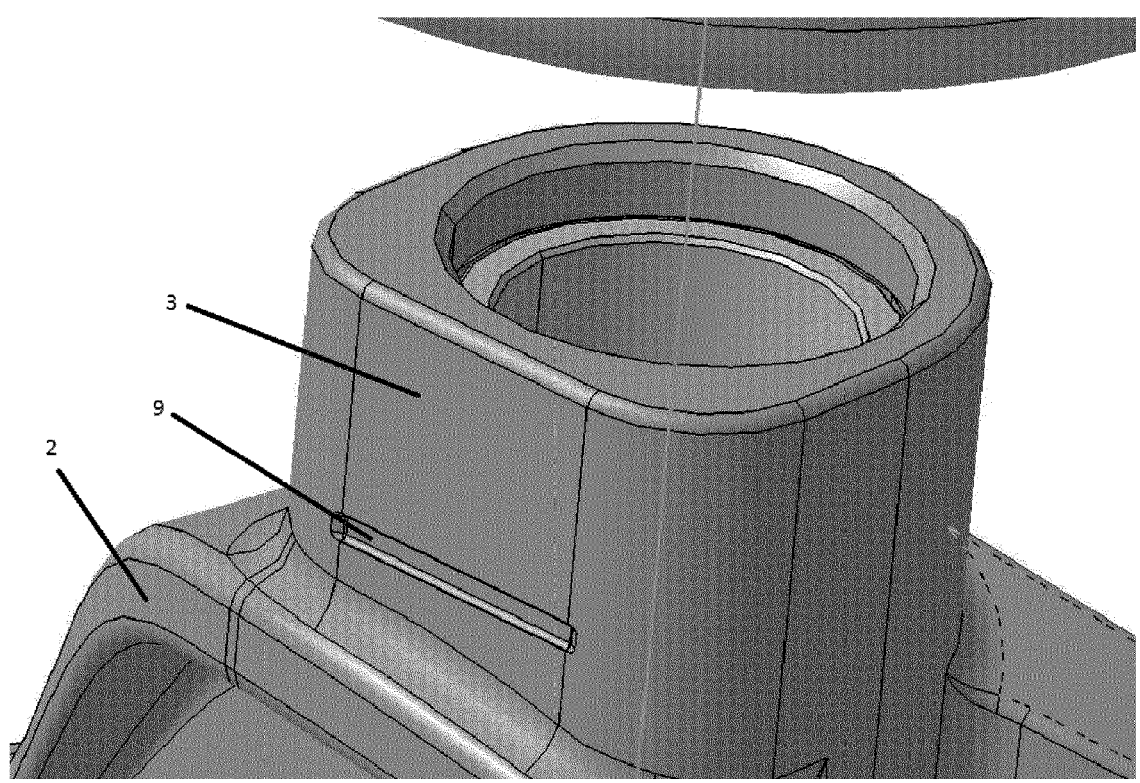
FIG. 5 shows the positive connection element of the body.

FIG. 4 shows the internal part of the positive connection element of the cover (4), on which there is a projection in the form of a rib (8), while FIG. 5 shows the positive connection element of the body (3) with a recess in the form of a groove (9). After fastening the cover (1) on the body (2), the rib is situated in the grooves blocking the movement of the cover in a direction parallel to the X axis, i.e., the axis of rotation of the shaft (11).

In other sample embodiments, it is possible to situate projections on the body (2) and recesses in the cover (1). Moreover, both projections and recesses can be situated in both the body (2) and on the cover (1).

The projections and recesses also need not be perpendicular to the axis of rotation of the shaft (11). For example, they can also be arranged slanted.

It is also possible to use means other than projections and recesses for blocking the movement of the cover (1) along the X axis, such as strut elements.

The invention claimed is:

1. A water draining cover for an automotive windshield wiping mechanism, comprising:
    a positive connection element of the cover for securing on a body of a shaft; and
    an opening for the shaft surrounded by a gutter part containing a drainage opening,
    wherein the positive connection element of the cover does not have a continuous rotary symmetry with regard to an X-axis, and in each transverse section in a plane perpendicular to the X-axis the positive connection element has the shape of a convex figure enclosing the opening, and
    a means for blocking the movement of the cover in a direction parallel to the X-axis when the cover is mounted on the body, the means for blocking being in the form of at least one projection and/or recess perpendicular to the X-axis, the X-axis being defined as a straight line passing through the opening for the shaft, coinciding with an axis of rotation of the shaft when the cover is properly mounted on the body.

2. The cover according to claim 1, wherein said convex figure does not have any rotational symmetry with respect to the X-axis.

3. The cover according to claim 1, the means for blocking comprising two projections in the form of ribs perpendicular to the X-axis, the two ribs being disposed symmetrically on the positive connection element of the cover.

4. The cover according to claim 1, the means for blocking comprising two recesses in the form of grooves perpendicular to the X-axis, the two recesses being disposed symmetrically on the positive connection element of the cover.

5. The cover according to claim 1, wherein the opening for the shaft is surrounded by a collar.

6. An automotive windshield wiper mechanism, comprising: a cover according to claim 1, mounted on a body, wherein the positive connection element of the cover forms a positive connection with a positive connection element of the body such that rotation of the cover about the X-axis is blocked.

7. The mechanism according to claim 6, wherein the means of blocking the movement of the cover situated on the positive connection element of the cover cooperate with the means of blocking the movement of the cover situated on the positive connection element of the body.

* * * * *